UNITED STATES PATENT OFFICE 2,021,712

PRECIPITATION OF PROTEINACEOUS MATTER BY CHLORINE

Stefa Ansbacher, George E. Flanigan, and George C. Supplee, Bainbridge, N. Y., assignors to The Borden Company, New York, N. Y., a corporation of New Jersey No Drawing. Application June 18, 1932, Serial No. 618,020

14 Claims. (Cl. 99—11)

This invention relates to the chemical treatment of foodstuffs and other animal and vegetable products, for the purpose of abstracting proteinaceous matter therefrom.

In various industries it is desirable or even necessary to remove organic nitrogenous matter from solutions or suspensions either for the purpose of facilitating manufacturing processes or for the recovery and conservation of such materials which it may be desired to use commercially. Various methods for the precipitation of proteinaceous matter have been used. Under suitable conditions many of the true proteins may be precipitated. Acidification, heat, heat and acidification, or various precipitants are commonly used. These general procedures are more or less efficient depending upon the method of application, the character of the material present and the degree of quantitative removal desired.

While many reagents are known to be capable of precipitating the true proteins and a certain portion of the unidentified proteinaceous bodies, commercial processes employing such respective reagents as are adaptable for the particular process do not succeed in complete removal of such bodies. Furthermore, such reagents are, in the main, unsuitable for commercial use in this field, due to the toxic characteristics of some and the excessive cost of others.

By the process to be described, solutions and suspensions of products of animal and vegetable origin may be substantially completely freed of proteinaceous matter, in a simple manner and without undue expense.

We have determined that chlorine gas will bring about complete or substantially complete precipitation of the proteinaceous matters contained in many solutions or suspensions such as milk and whey; solutions and suspensions of soy bean meal, cotton seed meal, wheat gluten; meat extracts, etc., removing from such solutions and suspensions not only the true proteins but also substantially all of the protein split-products and unidentified proteinaceous bodies present therein.

In carrying out the process hereinafter described the particular method and apparatus employed will be dependent upon the substance to be treated and the volume of material to be handled. It is essential, however, to the best results, that every particle of the substance to be treated comes in contact with the chlorine. Agitation of the fluid or mixture during chlorination is desirable. If desired, the fluid may be acidified, in the manner well known in the art, prior to chlorination, in which case less chlorine is required to produce the desired degree of precipitation.

It has been found that although a precipitate is formed when only a small amount of chlorine is used, the precipitation of the proteinaceous matter is only completed after saturation has been reached. The amount of chlorine necessary to bring about saturation naturally varies with the character of the material to be treated, temperature, pressure, concentration, salt content, hydrogen ion concentration, catalysts possibly present, and other factors. After the precipitation of the proteinaceous matter has been completed, the precipitate may be removed from the fluid by filtration.

The following example will serve as an illustration of the working of the process:

If it is desired to remove the nitrogenous products contained in whey, for instance, as in the manufacture of milk sugar, the whey may be treated in any suitable container, for instance an open tank, and the chlorine introduced slowly through a diffusor connected with a cylinder or other container of liquid chlorine. Chlorination should continue until the whey is saturated with chlorine, at which time it will be found that substantially complete precipitation of the proteinaceous content of the whey has occurred. The time consumed will, of course, depend upon all of the factors referred to above as determinate of the quantity of chlorine to be employed. To make certain that the precipitation has been completed, a sample of the chlorinated product may be filtered. If it filters quickly, if the filtrate becomes colorless upon standing, and if no precipitate or turbidity results from rechlorination, the precipitation of proteinaceous matter has been completed. The precipitated matter may then be readily filtered out of the fluid.

It will be found that the nitrogen content of whey treated by this process may be reduced to less than .01%, which indicates more complete precipitation of proteinaceous matter than has been attainable by the processes heretofore practiced.

Excess chlorine may be removed from the fluid under treatment by the use of heat, aeration, or heat and aeration. For some purposes it may be unnecessary to remove all of the chlorine from the fluid. If it is desired to do so, appropriate means may be employed, depending upon the use which is to be made of the resultant product. The use of particular means for this purpose, however, is not a part of the present invention.

While we have given only one illustration of the use to which our process may be put, it is apparent that many and widely divergent uses of it may be made. The terms and expressions employed in the foregoing specification are terms of description, and not of limitation, and we do not desire to be limited to the particular apparatus and technique described, but recognize that many variations of the same may be employed without departing from the scope of our novel process.

What we desire to claim is:

1. A process for the precipitation of naturally occurring proteinaceous matter in a fluid containing such matter, comprising passing chlorine gas into said fluid at a pH value below 7 and simultaneously agitating said fluid.

2. A process for the removal of proteinaceous matter from a fluid containing such matter, comprising passing chlorine gas into said fluid at a pH value below 7 and simultaneously agitating said fluid, whereby said fluid becomes substantially saturated with the chlorine gas, and filtering the resulting precipitate from said fluid.

3. A process for the precipitation of proteinaceous matter from a fluid containing such matter, comprising adding acid to said fluid and thereafter passing chlorine gas into said fluid at a pH value below 7.

4. A process for the precipitation of proteinaceous matter from a fluid containing such matter, comprising adding acid to said fluid, passing chlorine gas into said fluid at a pH value below 7, and simultaneously agitating said fluid.

5. A process for the removal of proteinaceous matter from a fluid containing such matter, comprising adding acid to said fluid, passing chlorine gas into said fluid at a pH value below 7, and simultaneously agitating said fluid and filtering 6. A process for precipitating proteinaceous matter from a fluid containing such matter, comprising adding acid to said fluid and saturating said fluid with chlorine gas.

7. A process for the removal of proteinaceous matter from a fluid containing such matter, comprising adding acid to said fluid, saturating said fluid with chlorine gas, and filtering the resulting precipitate from said fluid.

8. In a process for the removal of naturally occurring proteinaceous matter from milk, whey and like fluids, the step comprising precipitating said matter by the action of chlorine gas upon said fluids.

9. A process for the removal of proteinaceous matters from milk, whey and like fluids, comprising adding acid to said fluids and thereafter subjecting said fluids to the action of chlorine.

10. A process for the precipitation of proteinaceous matter in a fluid containing such matter, comprising passing chlorine gas through the fluid at a pH value of less than 7 to complete the precipitation of the proteinaceous matter.

11. A process as defined in claim 13 in which the chlorine gas is passed through the fluid until it is substantially saturated with chlorine gas.

12. A process as defined in claim 11 including agitating the fluid and passing chlorine through it until the fluid is saturated therewith.

13. A process as defined in claim 4 in which the chlorination is continued until a sample of the fluid filters quickly and no precipitate results from rechlorination.

14. A process as defined in claim 11 in which the chlorination is continued until a sample of the fluid filters quickly and no precipitate results from rechlorination.

S. ANSBACHER.
G. E. FLANIGAN.

CERTIFICATE OF CORRECTION.

Patent No. 2,021,712.

November 19, 1935.

STEFAN ANSBACHER, ET AL.

It is hereby certified that error appears in the printed specification of the above numbered patent requiring correction as follows: Page 2, second column, line 24, claim 11, for the numeral "13" read 10; lines 27 and 34, claims 12 and 14 respectively, for the numeral "11" read 8; line 30, claim 13, for the numeral "4" read 1; and that the said Letters Patent should be read with these corrections therein that the same may conform to the record of the case in the Patent Office.

Signed and sealed this 18th day of February, A. D. 1936.

Leslie Frazer
Acting Commissioner of Patents.

(Seal)